United States Patent
Bute et al.

(10) Patent No.: US 11,010,812 B2
(45) Date of Patent: May 18, 2021

(54) SMART DEVICE RECOMMENDATIONS

(71) Applicant: International Business Machines Corporation, Armonk, NY (US)

(72) Inventors: Yogesh A. Bute, Pune (IN); Anurag Srivastava, Pune (IN); Sandip P. Thube, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 15/068,696

(22) Filed: Mar. 14, 2016

(65) Prior Publication Data

US 2017/0262923 A1   Sep. 14, 2017

(51) Int. Cl.
*G06Q 30/00* (2012.01)
*G06Q 30/06* (2012.01)
*H04L 29/08* (2006.01)

(52) U.S. Cl.
CPC ......... *G06Q 30/0631* (2013.01); *H04L 67/12* (2013.01)

(58) Field of Classification Search
CPC ..... G06Q 30/00; G06Q 30/0631; H04L 67/12
USPC ........................................................ 705/26.7
See application file for complete search history.

(56) References Cited

U.S. PATENT DOCUMENTS

| | | | | |
|---|---|---|---|---|
| 2011/0320486 A1* | 12/2011 | Berkovitch | ............ | G06Q 10/06 707/769 |
| 2012/0101806 A1* | 4/2012 | Davis | .................... | G06Q 30/02 704/9 |
| 2013/0024301 A1* | 1/2013 | Mikan | .................... | G06Q 30/01 705/16 |
| 2013/0290110 A1* | 10/2013 | LuVogt | ............. | G06F 17/30867 705/14.66 |
| 2014/0039979 A1* | 2/2014 | Zhang | ................ | G06Q 30/0202 705/7.31 |
| 2014/0129394 A1* | 5/2014 | Oliver | .................... | G06Q 30/06 705/27.2 |
| 2014/0172479 A1* | 6/2014 | Gallagher | ........ | G06Q 10/06311 705/7.15 |
| 2014/0244768 A1* | 8/2014 | Shuman | .................. | H04W 4/70 709/206 |
| 2015/0019342 A1* | 1/2015 | Gupta | .................... | G06Q 10/20 705/14.66 |
| 2015/0134479 A1* | 5/2015 | Gadre | ................ | G06Q 30/0609 705/26.35 |
| 2015/0134481 A1* | 5/2015 | Glickfield | .......... | G06Q 30/0609 705/26.35 |

(Continued)

OTHER PUBLICATIONS 8 ways medical device manufacturers can use strategic IoT solutions. (Jan. 2016). Control Engineering, 63(1), DE1(3). (Year: 2016).*

(Continued)

*Primary Examiner* — Abby J Flynn
(74) *Attorney, Agent, or Firm* — Timothy J. Singleton

(57) ABSTRACT

A sensor-enabled smart device may be recommended to a user. The sensor-enabled smart device may be identified from a registry on a network. The smart device may have the ability to send and receive real-time data over the network. A value of the device, to the user, may be determined based on user analytics. A vendor through which to sell the device may be determined based on market analytics. A sale of the device via the vendor may be recommended to the user.

20 Claims, 9 Drawing Sheets

(56) References Cited

U.S. PATENT DOCUMENTS

2015/0278810 A1* 10/2015 Ramatchandirane .. G06Q 20/30
                                                    705/16
2016/0180723 A1*  6/2016 Tatourian ................. G09B 5/00
                                                    434/237

OTHER PUBLICATIONS

Ryan Kh, "Benefits of the Internet of Things for Ecommerce," Nov. 2, 2015 <https://www.mycustomer.com/community/blogs/ryankh14/benefits-of-the-internet-of-things-for-ecommerce> (Year: 2015).*

IBM, "Automatic Management of On-Line Inventory for Enhancing Commerce Opportunities", ip.com, An IP.com Prior Art Database Technical Disclosure, 7 pages. Original Publication Date: Dec. 9, 2008. IP.com No. 000177329.

Vanhemert, K., "Needy Robotic Toaster Sells Itself if Neglected", wired.co.uk, Mar. 18, 2014, 3 pages. http://www.wired.co.uk/news/archive/2014-03/18/addicted-toaster.

Mell et al., "The NIST Definition of Cloud Computing", Recommendations of the National Institute of Standards and Technology, U.S. Department of Commerce, Sep. 2011, Special Publication 800-145, 7 pages.

\* cited by examiner

SMART DEVICE RECOMMENDATIONS

BACKGROUND

The present disclosure relates to sensor-enabled items, and more specifically, to providing recommendations for sensor-enabled devices.

The internet of things is generally a network of physical objects, devices, vehicles, buildings, and other items that are embedded with electronics, software, sensors, and network connectivity, which enables these objects to collect and exchange data. These items may be in continuous communication with servers on the cloud.

SUMMARY

Embodiments of the present disclosure may be directed toward a method for recommending a device to a user. The method may begin when a system identifies a sensor-enabled smart device from a registry on a network. The sensor-enabled smart device may have the ability to send and receive real-time data over the network. Based on user analytics, a value of the device to the user may be received. A vendor through which to sell the device may be determined based on market analytics. The system may then recommend to the user, a sale of the device via the vendor.

Embodiments of the present disclosure may be directed toward a computer system comprising at least one processor circuit configured to identify a sensor-enabled smart device from a registry on a network. The sensor-enabled smart device may have the ability to send and receive real-time data over the network. A value of the device to the user may be received, based on user analytics, and a vendor through which to sell the device may be determined, based on market analytics. The system may then recommend to the user a sale of the device, via the vendor.

Embodiments of the present disclosure may be directed toward a computer program product for recommending a sensor-enabled device. The computer program product may have a computer readable storage medium with program instructions embodied therewith. The computer readable storage medium is not a transitory signal per se. The program instructions may be executable by a computer processing circuit to cause the circuit to perform a method. The method may include identifying a sensor-enabled smart device from a registry on a network. The sensor-enabled smart device may have the ability to send and receive real-time data over the network. The system may receive a value of the device to the user based on user analytics. The system may determine a vendor through which to sell the device, based on market analytics. The system may then recommend a sale of the device via the vendor, to the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
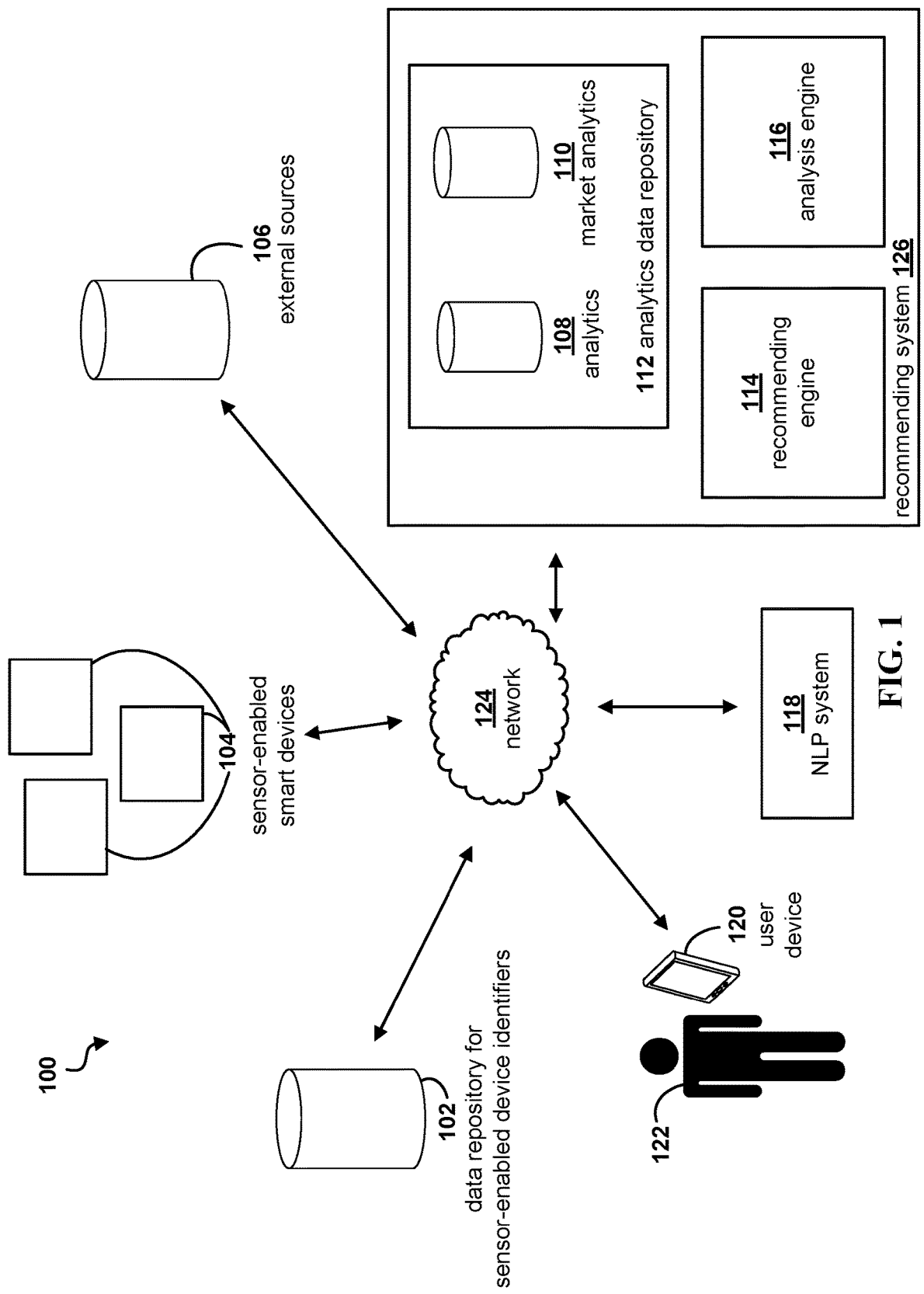
FIG. 1 depicts a system diagram for recommending sensor-enabled devices for sale, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to detection and data collection from smart devices, more particular aspects relate to recommendations for sensor-enabled smart devices. While the present disclosure is not necessarily limited to such applications, various aspects of the disclosure may be appreciated through a discussion of various examples using this context.

A user may possess a number of household items. These household items, for example, a kitchen appliance, may be sensor-enabled devices. In embodiments, these sensor-enabled devices may be connected over a network. The network may allow devices within a same household or within different homes to be connected. The network may also allow for connectivity between devices owned by different users, device manufacturers, device retailers, or other entities. In some cases, the devices may be a part of the internet of things. The connectivity of the devices may allow for real-time communication of data including, for example, usage data, price data, repair data, or other data associated with the device or use of the device. The data communicated by these devices, over the network, may be used to sell or exchange the devices, as described herein.

FIG. 1 depicts a system diagram 100 for recommending sensor-enabled devices for sale, according to embodiments. One or more sensor-enabled smart devices 104 may be connected over a network 124. Each sensor-enabled smart device may have the ability to send and receive real-time data over the network.

In embodiments, the network 124 can be implemented using any number of any suitable communications media. For example, the network 124 may be a wide area network (WAN), a local area network (LAN), the Internet, or an intranet. In embodiments, the network 124 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers including sensor-enabled devices (e.g., hundreds or thousands of computers or more, including those contained within sensor-enabled smart devices 104) disposed within one or more data centers or homes or other locations and configured to share resources over the network 124.

In embodiments, a data repository for sensor-enabled device identifiers or 'registry' 102 may be contained within a recommending system 126, or may be communicatively coupled to the recommending system 126 and the sensor-enabled smart devices 104, over the network 124. The registry 102 may include identifiers for each sensor-enabled smart device 104 connected on the network. In some embodiments, the network and system may run within a cloud computing environment or, 'on the cloud.' Each identifier within the registry 102 may comprise data about the particular smart device (e.g., a sensor-enabled smart device 104), including identity, type, age, usage, and other data. For example, a smart device may be an electronic device that may be able to connect to other devices or networks via different protocols, including Bluetooth, near field communication (NFC), WiFi, or others. A smart device may also be able to operate to some extent interactively and autonomously. In some embodiments, a user 122 may access the sensor-enabled device data contained within the registry 102 using a user device 120. The user device could be a smart phone, tablet, laptop, or other device.

In embodiments, one or more external sources 106 may be accessed by the recommending system 126 or a natural language processing (NLP) system 118. External sources 106 may include websites, databases, or other accessible data sources. This data can be accessed by the NLP system for processing and sent to the recommending system 126 (e.g., for use by an analysis engine 116). The recommending system 126 may also access external sources 106 directly or over a network 124.

In embodiments, the recommending system 126 may comprise one or more engines and/or databases including, for example, those depicted in FIG. 1. The recommending system 126 may include the analysis engine 116. The analysis engine 116 may be responsible for sending and receiving data from external sources 106, the NLP system 118, and one or more data repositories, including the data repository for the registry 102 and an analytics data repository 112. In embodiments, each of these data repositories, or others, may be contained within the recommending system 126 or contained elsewhere and accessed over a network. The analysis engine 116 may analyze accessed data in order to determine, for example, whether a particular sensor-enabled smart device 104 is no longer needed by the user 122. The analysis engine may also receive data from the NLP system 118 accessed from external sources 106, for analysis. For example, the analysis engine 116 may access NLP-processed market data, including market trends for a particular item or class of items, for analysis, in order to determine a best time and price to sell a particular item (e.g., a sensor-enabled smart device 104, determined to no longer be used by the user 122). The analysis engine 116 may access and store data in the analytics data repository 112. The analytics data repository 112 may comprises databases including an analytics database 108, as well as a market analytics database 110, or others.

The analysis engine 116 can then pass the analyzed data along to a recommending engine 114, which can score the various options and recommend, to the user 122, via, for example, the user device 120, a product or products to be sold, a vendor through which to sell the product, and in embodiments a price point at which the product is predicted to sell. The recommending engine 114 may also supply additional data including product usage, current financial status of the user 122, or other data which may be relevant to the user 122 in making the determination.

Figure 2:
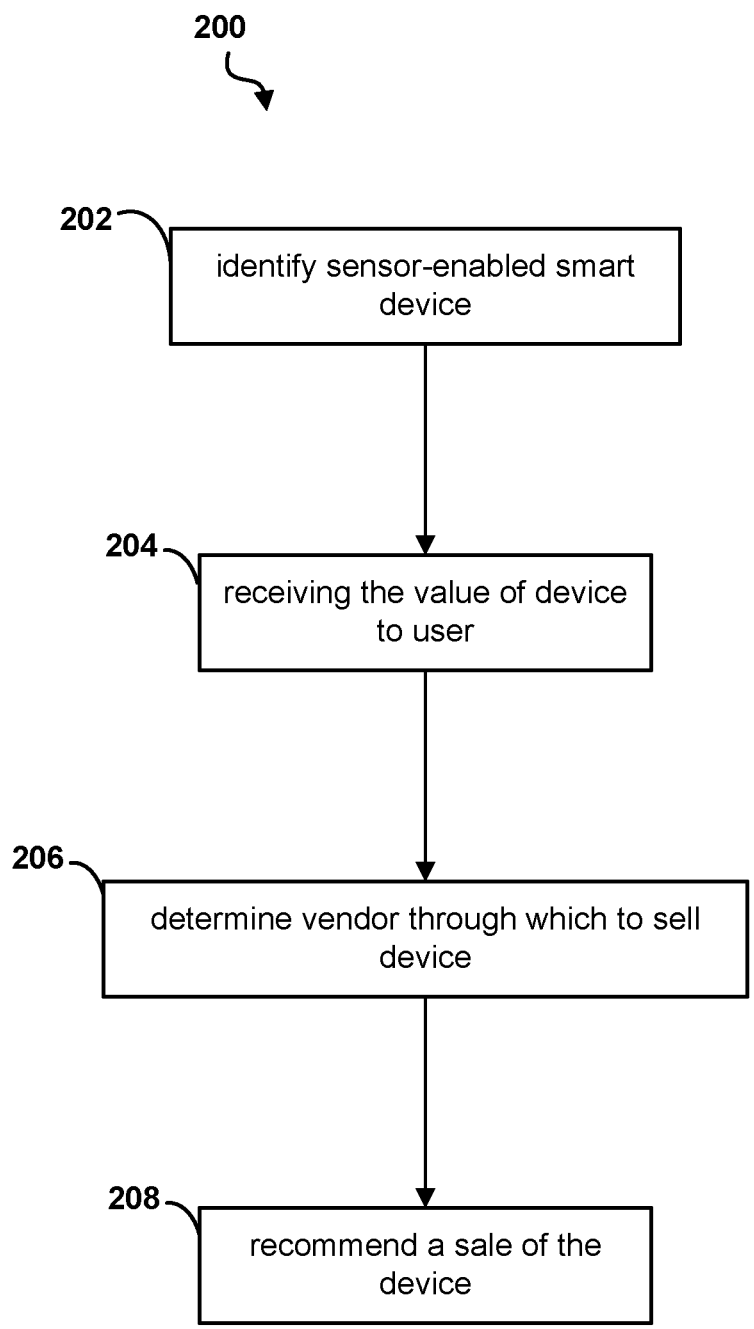
FIG. 2 depicts a flow diagram of a method for recommending a device for sale, according to embodiments.

FIG. 2 depicts a flow diagram of a method 200 for recommending a device for sale, according to embodiments. The method 200 may begin when a recommending system, for example the recommending system 126 of FIG. 1, identifies a sensor-enabled smart device, per 202. In embodiments, the identification may be triggered based on a latency period between uses of a particular device, by an age of a particular device, by a particular threshold of number of devices being owned, or in another way. For example, a device could trigger identification by the system after it has not been used by a user, for example user 122 of FIG. 1, for a set number of weeks. The recommending system can then receive the value of the device to the user, per 204. In embodiments, the system may determine the value as described herein, or the value may be determined externally from the system, and received by the system. In embodiments, the value of the device to the user can be determined based on user analytics. The user analytics may be performed using a variety of data including device data and user data. Device data may include a frequency of device usage (e.g., times per week or month the device is used by the user), age of device (e.g., time owned by the current user, time since device manufacture), and novelty of device (e.g., number of similar or same devices owned by user). The value may be determined using data accessed and analyzed from external sources (e.g., external sources 106 of FIG. 1), including websites, databases, or other real-time based analytics mechanisms. The system could also access user data in determining the user analytics. The user data could be accessed from a user's personal finances, including, for example, current bank account balances, spending trends, a travel schedule, a personal calendar, or other financial or calendar data that may be relevant to the user's current and future financial state. The system could also use data obtained from the device itself, including, for example, data stored on and obtained from a data repository for the devices (e.g., data repository for sensor-enabled device identifiers of FIG. 1). Using the data, which may be received following processing by an NLP system (e.g., NLP system 118), for use by an analysis engine of the system (e.g., analysis engine 116 of system 126 of FIG. 1). In some embodiments, the data may be received by the system as analyzed data, stored in an analytics data repository (e.g., analytics data repository 112), and used to analyze the value of the device to the user.

The recommending system may then determine a vendor through which to sell the device, per 206. In embodiments, the system may access data from one or more external sources in making this determination. For example, the system may access data from various websites on the Internet that indicate price points and various vendors or online retailers through which the device can be sold. The system may also use market analytics to determine the vendor through or price at which the device can be sold. The market analytics may be performed using market data including historical pricing, upcoming sales, other market predictions, and geographic location to inform the determination of the particular vendor. The market data may also include data about weather patterns that may impact the sale of a products within the same market segment of the device. The market data may also include supply data for products similar to the device. Using this data, the system can determine a particular vendor through which the device could be sold, based on factors, such as price, ease-of-use, or others.

In embodiments, the recommending system could then recommend the sale of the device to the user, per 208. The recommendation could include the name of the device, as well as other identifying data, including the age of the device, the purchase date, the number of uses, the frequency of use, the location of the device, or others. The recommendation could also include the vendor through which the device may be sold for a particular price, as determined by the system. In embodiments, the recommendation may include a ranking of one or more vendors, with scores associated with a particular number of categories listed by each vendor. For example, the system could list a first vendor, an online, free user-to-user sale website, with an overall ranking of "1" or first, and individual scores in categories such as "ease of posting and delivery," "geographic proximity of potential buyers," "carbon footprint left by sale and shipping," "expected sale price (highest)," "ethics of the vendor," "customer satisfaction," or other categories deemed relevant to a particular user or user group. In embodiments, the recommendation may also include "internal" or Internet of Things (IOT) based sales. For example, this could include a list of one or more other users on the IOT network, who may have a need for the item, or a willingness to exchange an IOT item for the user's IOT device. In this way, a user can sell or exchange items with other IOT device users, without the need to post to an external source.

In embodiments, the recommendation can also include data or links to data that may be accessed by the user to help the user better understand the recommendation. For example, the system may provide the user with raw data or explanations about the value determination or the vendor determination.

Figure 3:
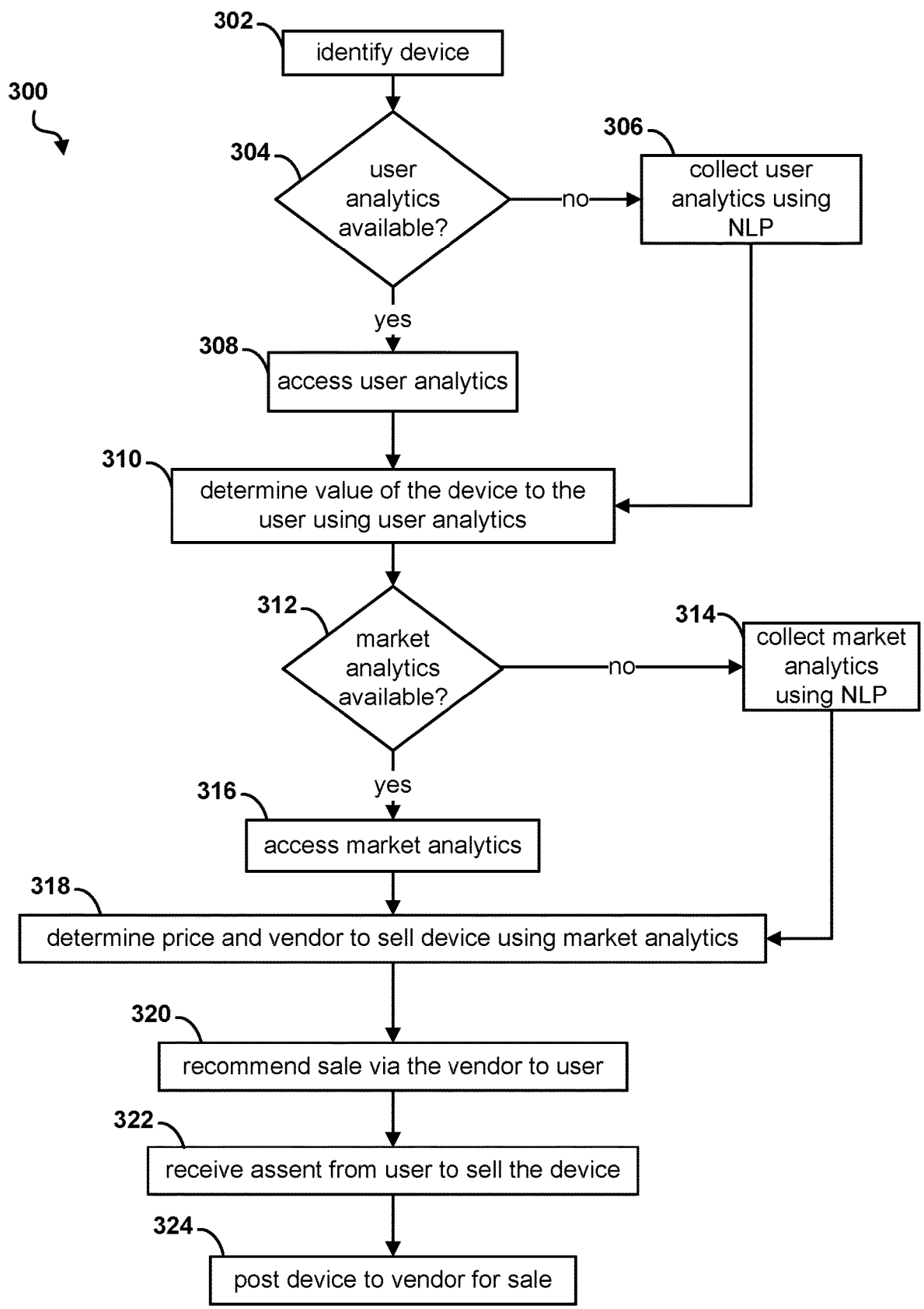
FIG. 3 depicts a method for recommending a sale of a sensor-enabled device, using real-time analytics, according to embodiments.

FIG. 3 depicts a method 300 for recommending a sale of a sensor-enabled device, including, for example, a sensor-enabled smart device, using real-time analytics, according to embodiments. The method 300 may begin when a device is identified by the recommending system, per 302, as described herein. In embodiments, this may be the recommending system 126 of FIG. 1. The recommending system may then determine if user analytics are available, per 304. In embodiments, user analytics may be available if they are stored within one or more databases within the recommending system. In embodiments, user analytics may be available to the user if they are accessible from one or more external systems, including, for example, an NLP system or another analytics system or engine.

If user analytics are not available at 304, the recommending system may collect user analytics using, amongst others, NLP, per 306, and as described herein. If user analytics are available, the recommending system may access the user analytics, per 308. In embodiments, this may include accessing them from an internal or external database. It may also include requesting real-time analytics data from an NLP system or accessing them in another way.

Using the user analytics, the system may determine the value of the device to the user, per 310. In embodiments, this may include considering factors such as current financial status of the user, frequency of use of the device, original cost of the device, age of the device, or other factors. The system may then determine if market analytics are available to the system, per 312. If market analytics are available, the system may access the market analytics, per 316, as described herein. If market analytics are not available, the system may collect market analytics using, among others, NLP, per 314. The system may then recommend a sale via the vendor to the user, per 320. The recommendation may include aspects described herein, including a price, vendor, or other data. The system may then receive assent or permission from the user to sell the device, per 322. In embodiments, this assent may be received in response to a selection of a button, a slide of an image, or another action on a user interface of, for example, a mobile device, or other user device. An assent may be sent and received in another way, as is appropriate for the particular user, user device, and sale device. In response to the assent, the system may then post the device to the vendor for sale, per 324. For example, this could involve listing the device for the sale indicated to the user to the vendor listed in the recommendation.

Figure 4:
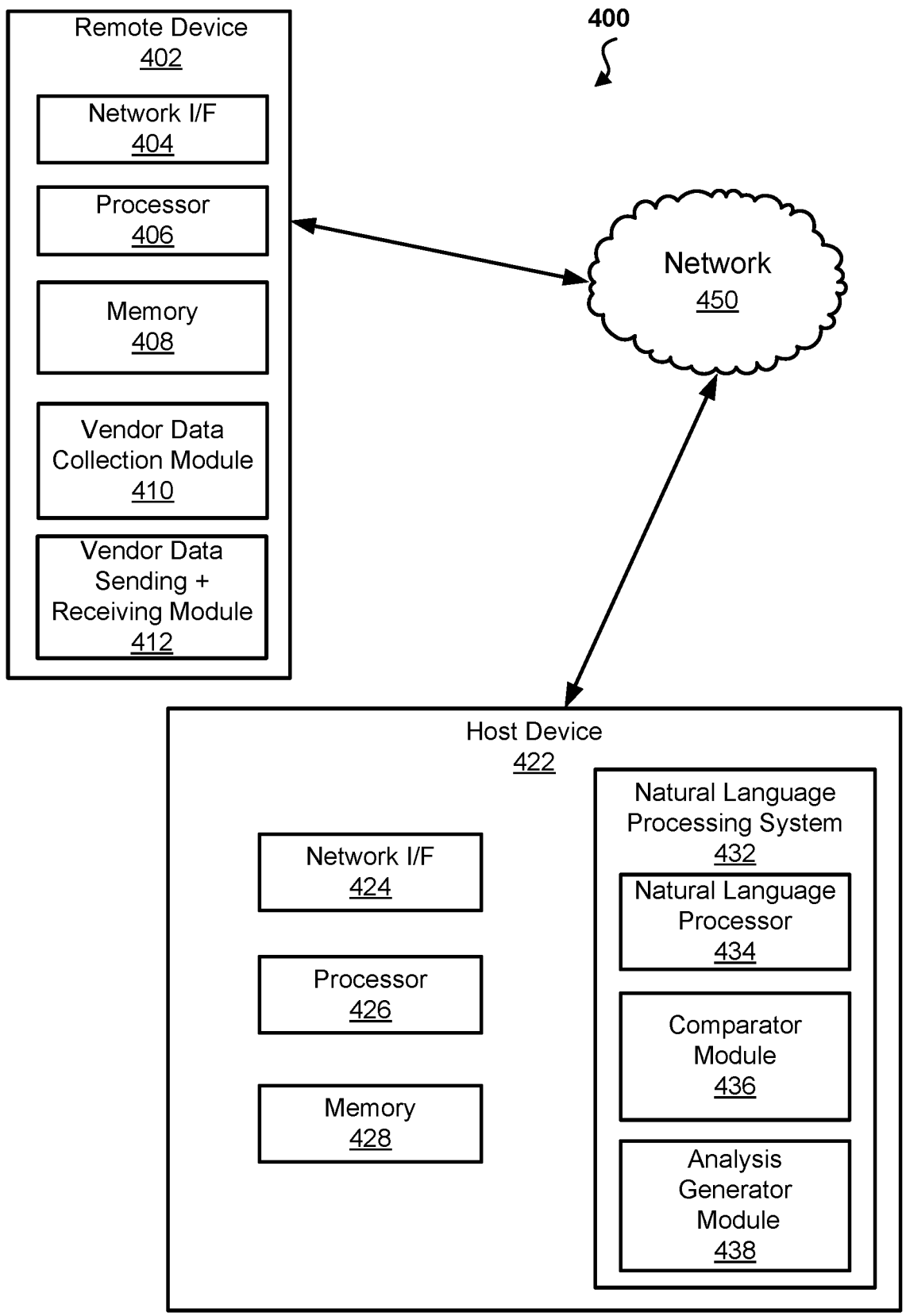
FIG. 4 depicts a block diagram of an example portion of a computing environment in which embodiments of the present disclosure may be implemented.

FIG. 4 depicts a block diagram of an example portion of a computing environment 400 in which embodiments of the present disclosure may be implemented. In embodiments, the computing environment 400 may include a remote device 402 and a host device 422.

According to embodiments, the host device 422 and the remote device 402 may be computer systems. In embodiments, the host device 422 may host a recommending system, for example system 126 of FIG. 1. In other embodiments, the host device 422 may host a NLP system, and may be a device separate from system 126 of FIG. 1. The remote device 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be, e.g., modems or interface cards. The remote device 402 and/or the host device 422 may be equipped with a display or monitor. Additionally, the remote device 402 and/or the host device 422 may include optional input devices (e.g., a keyboard, mouse, scanner, or other input device), and/or any commercially available or custom software (e.g., browser software, communications software, server software, NLP software, search engine, and/or web crawling software, filter modules for filtering content based upon predefined parameters, etc.). In some embodiments, the remote device 402 and/or the host device 422 may be servers, desktops, laptops, or mobile devices.

The remote device 402 and the host device 422 may be distant from each other and may communicate over a network 450. In embodiments, the host device 422 may be a central hub from which a remote device 402 and other remote devices (not pictured) can establish a communication connection, such as in a client-server networking model. In some embodiments, the host device 422 and remote device 402 may be configured in any other suitable network relationship (e.g., in a peer-to-peer configuration or using another network topology).

In embodiments, the network 450 can be implemented using any number of any suitable communications media. For example, the network 450 may be a wide area network (WAN), a local area network (LAN), the Internet, or an intranet. In certain embodiments, the remote device 402 and the host device 422 may be local to each other, and communicate via any appropriate local communication medium. For example, the remote device 402 and the host device 422 may communicate using a local area network (LAN), one or more hardwire connections, a wireless link or router, the Internet, or an intranet. In some embodiments, the remote device 402, the host device 422, and any other devices may be communicatively coupled using a combination of one or more networks and/or one or more local connections. For example, the remote device 402 may be hardwired to the host device 422 (e.g., connected with an Ethernet cable) while a second device (not pictured) may communicate with the host device using the network 450 (e.g., over the Internet).

In some embodiments, the network 450 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 enables websites or other vendors to submit data to the host devices 422. In some embodiments, the vendor data collection module 410 may interface with one or more websites or databases within the memory 408 of the remote device 402. The vendor data collection module 410 may pass the data to the vendor data sending and receiving module 412. The vendor sending and receiving module 412 may take the data and send it, over the network 450, to the host device 450, for processing. In some embodiments, the host device 422 may include a NLP system 432. The NLP system 432 may include a natural language processor 434, a comparator module 436, and an analysis generator module 438. The natural language processor 434 may include numerous sub-components, such as a tokenizer, a part-of-speech (POS) tagger, a semantic relationship identifier, and a syntactic relationship identifier. An example natural language processor is discussed in more detail in reference to FIG. 5. The natural language processor 434 may be configured to perform NLP to ingest a set of keywords (e.g., keywords submitted by remote device 402) and/or to ingest historical message data (e.g., message data submitted by message sending and receiving module 412 of remote device 402).

The comparator module 436 may be implemented using a conventional or other search engine, and may be distributed across multiple computer systems. The comparator module 436 may be configured to search one or more databases or other computer systems for content ingested by the natural language processor 434. For example, the comparator module 436 may be configured to compare ingested keywords (e.g., keywords received from remote device 402) with a corpus or corpora of ingested communication data (e.g., communication data received from remote device 402) in order to help identify content that may appear in candidate messages.

The analysis generator module 438 may be configured to analyze a set of data, for example user or market data, and the historical messaging data (e.g., historical market data analyzed by the comparator module 436), to generate analyzed data that may be helpful in determining a value of a device to a user or a market value of data. The analysis generator module 438 may include one or more modules or units, and may utilize the comparator module 436, to perform its functions (e.g., to determine a relationship between a historical market price for a device and a device currently being analyzed for sale, to predict a future market price based on historical data, to determine the importance of an item based to a user based solely on the user's current financial, or others), as discussed in more detail in reference to FIG. 5.

While FIG. 4 illustrates a computing environment 400 with a single host device 422 and a single remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two remote devices or two host devices. The two host devices may be communicatively coupled using any suitable communications connection (e.g., using a WAN, a LAN, a wired connection, an intranet, or the Internet). The first host device may include a natural language processing system configured to receive and analyze content from historical communications or a user profile, and the second host device may include a natural language processing system configured to receive and analyze a set of keywords.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
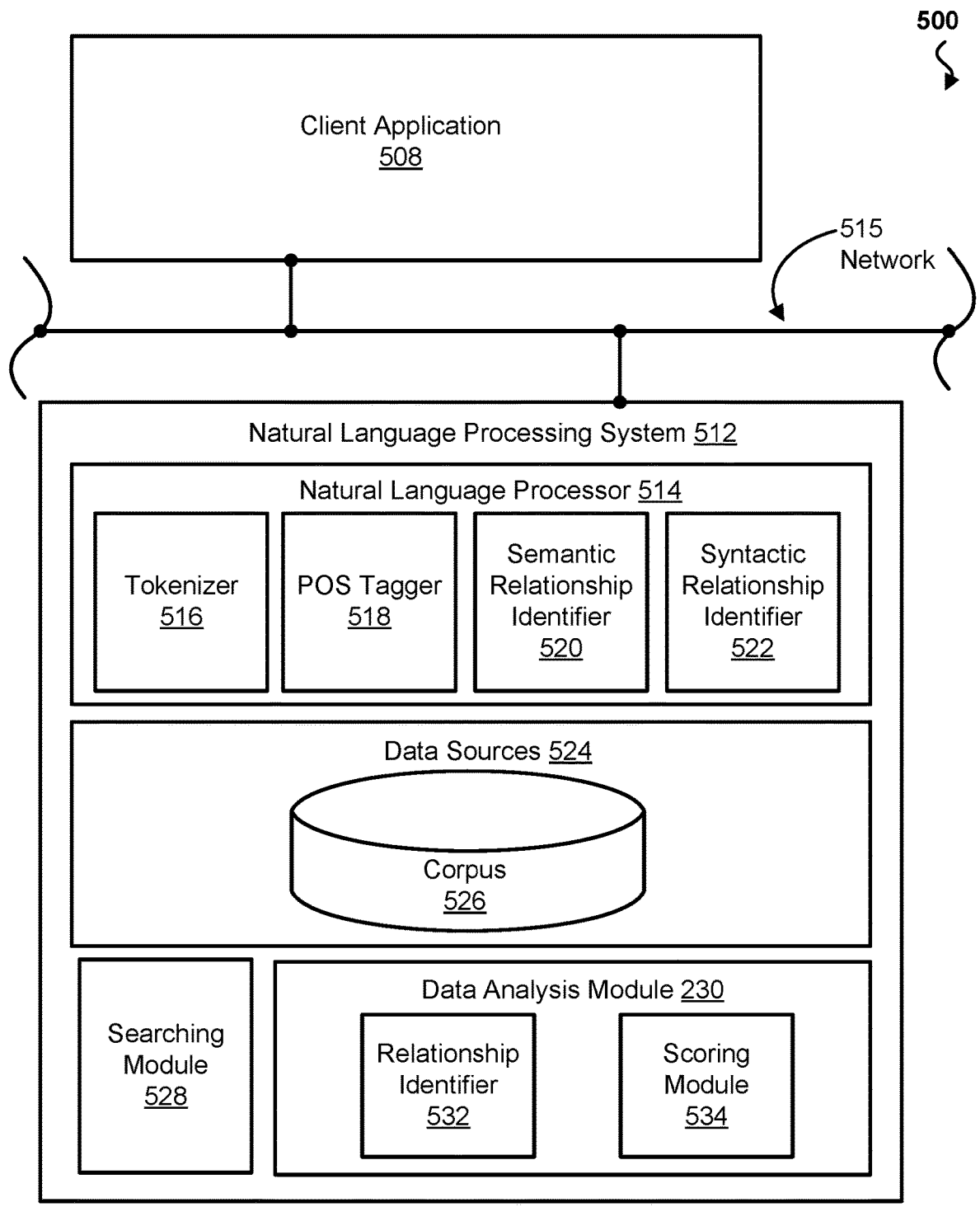
FIG. 5 depicts a block illustration of an example system architecture, including a natural language processing system, configured to analyze keywords and a corpus of data to generate a message, according to embodiments.

FIG. 5 depicts a block illustration of an example system architecture 500, including natural language processing system 512, configured to analyze keywords and a corpus of data to generate a message, according to embodiments. In embodiments, a remote device (such as remote device 502 of FIG. 5) may submit market or user data (e.g.,) to be analyzed to the natural language processing system 512 which may be housed on a host device (such as host device 422 of FIG. 4). A remote device (e.g., remote device 402 of FIG. 4) may include a client application 508, which may itself involve one or more entities operable to generate or modify keywords or messages, or communication or other profile data that may then be dispatched to a natural language processing system 512 via a network 515.

In embodiments, the natural language processing system 512 may respond to content submissions sent by a client application 508. Specifically, the natural language processing system 512 may analyze market data, user data, or other available content submitted to or accessed by the NLP system 512 to identify characteristics about the received content (e.g., a theme, main idea, and characters). In some embodiments, the natural language processing system 512 may include a natural language processor 514, data sources 524, a searching module 528, and a message generator module 530. The natural language processor 514 may be a computer module that analyzes the received content. The natural language processor 514 may perform various methods and techniques for analyzing the received content (e.g., syntactic analysis, semantic analysis, etc.). The natural language processor 514 may be configured to recognize and analyze any number of natural languages. In some embodiments, the natural language processor 514 may parse passages of the received content. Further, the natural language processor 514 may include various modules to perform analyses of electronic documents (e.g., social media pages, text message histories). These modules may include, but are not limited to, a tokenizer 516, a part-of-speech (POS) tagger 518, a semantic relationship identifier 520, and a syntactic relationship identifier 522.

In some embodiments, the tokenizer 516 may be a computer module that performs lexical analysis. The tokenizer 516 may convert a sequence of characters into a sequence of tokens. A token may be a string of characters included in written passage and categorized as a meaningful symbol. Further, in some embodiments, the tokenizer 516 may identify word boundaries in content and break any text passages within the content into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up words in passages to correspond to particular parts of speech. The POS tagger 518 may read a passage or other text in natural language and assign a part of speech to each word or other token. The POS tagger 518 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed content (e.g., the content of one social media post may shed light on the meaning of text elements in related social media post, or content of a first comment by a user on an Internet forum may shed light on meaning of text elements of a second comment by that user on the same or different Internet forum). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a passage with part of speech categories. In some embodiments, the POS tagger 518 may tag tokens or words of a passage to be parsed by the natural language processing system 512.

In embodiments, the semantic relationship identifier 520 may be a computer module that may be configured to identify semantic relationships of recognized text elements (e.g., words, phrases) in received content. In some embodiments, the semantic relationship identifier 220 may determine functional dependencies between entities and other semantic relationships.

In embodiments, the syntactic relationship identifier 522 may be a computer module that is configured to identify syntactic relationships in a passage composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that parses received content and generates corresponding data structures for one or more portions of the received content. For example, in response to receiving a set of email exchanges at the natural language processing system 512, the natural language processor 514 may output parsed text elements from the email messages as data structures. In some embodiments, a parsed text element may be represented in the form of a parse tree or other graph structure. To generate the parsed text element, the natural language processor 214 may trigger computer modules 516-522.

In some embodiments, the output of natural language processor 514 (e.g., ingested content) may be stored within data sources 524, such as corpus 526. As used herein, a corpus may refer to one or more data sources, such as the data sources 524 of FIG. 5. In some embodiments, the data sources 524 may include data warehouses, corpora, data models, and document repositories. In some embodiments, the corpus 526 may be a relational database.

In embodiments, the searching module 528 may search data sources 224 including the corpus 526 of ingested data. Using data associated with the user and device (e.g., metadata) including the age of user, age of device, type of device, past usage history, etc., the searching module 528 may search the data sources 524 for data relevant to the candidate message generation. In embodiments, the data analysis module 530 may be a computer module that generates one or more candidate messages based on ingested keywords and other ingested data including historical communications and relationship type-based communications.

In some embodiments, data analysis module 530 may include a relationship identifier 532 and a scoring module 534. The relationship identifier 532 may identify a relationship between ingested keywords and ingested communication or profile data. This may be done by searching, using the keywords, the ingested content of the user data including profile data about the user (e.g., age, financial status, spending habits) and market data (including historical pricing, upcoming sales, purchasing and selling trends, website traffic of particular vendors, etc.). In embodiments, this search may be conducted over only the data identified as relevant based on the results of the search by the searching module 528. Certain similarities between keywords and the ingested contented may be weighted more heavily than others. For example, the usage of a particular device by a user may be more important, and weighted more heavily, than the user's current financial status, if the financial status is relatively secure. In some embodiments, the relationship identifier 532 may also search the corpus 526 for additional data associated with the keyword, the sender, the recipient, or the content of the messages.

In some embodiments, after relationship identifier 532 identifies a relationship between the keywords and the ingested content, the scoring module 534 may evaluate the relationship between the found content (e.g., from previously analyzed market data) and the device usage. The relationship may be evaluated based on a set of relatedness criteria in order to determine whether or not the relationship satisfies a relatedness threshold. In some embodiments, this can help to ensure that data that is included in the value and vendor determinations is appropriate and relevant to the determination.

Figure 6:
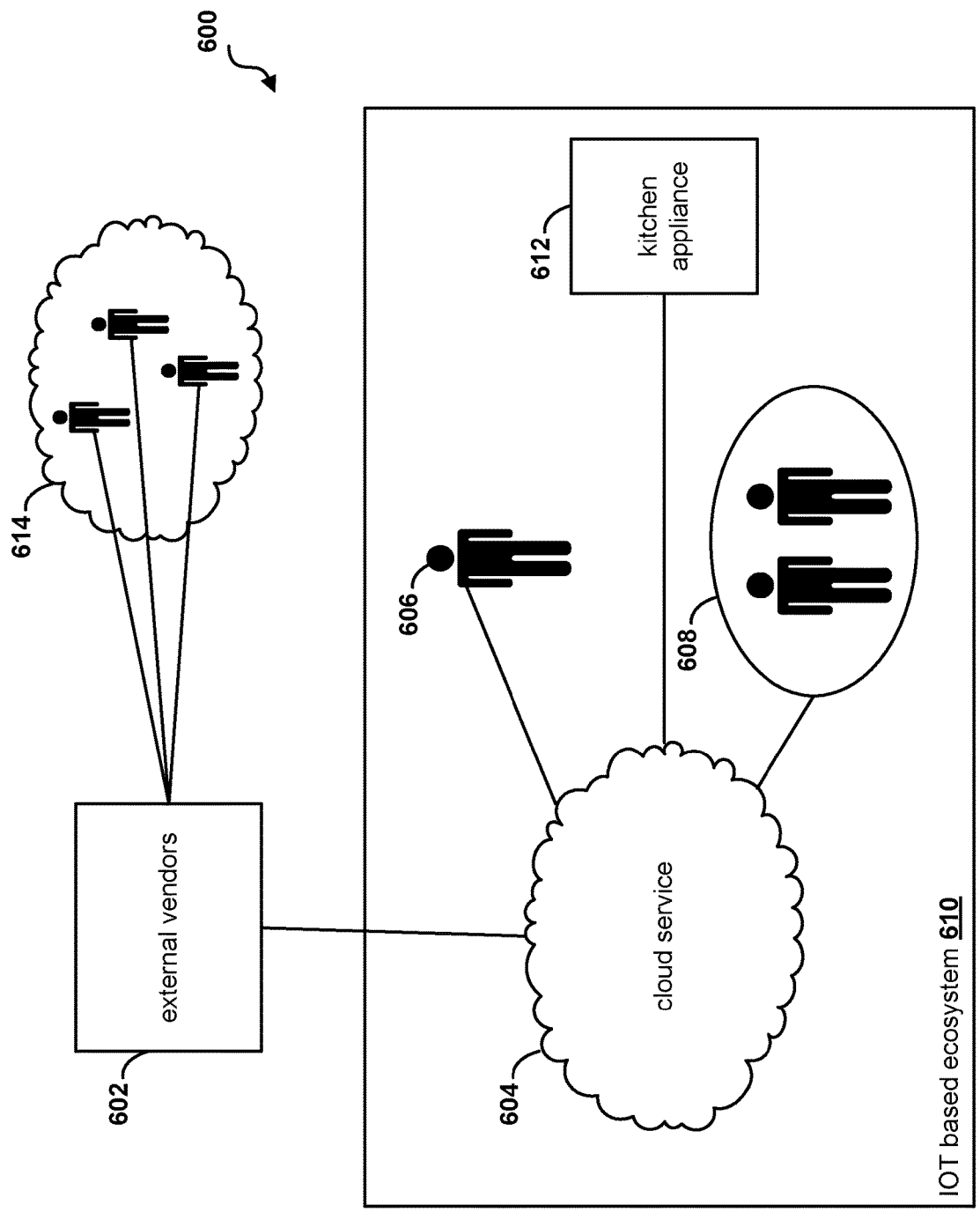
FIG. 6 depicts a use case of computing environment for recommending sale of a kitchen appliance using an internet of things (IOT) ecosystem, according to embodiments.

FIG. 6 depicts a use case of computing environment 600 for recommending sale of a kitchen appliance using an internet of thing (IOT) ecosystem, according to embodiments. One or more devices, including a kitchen appliance 612 may exist within an IOT based ecosystem 610. In an IOT ecosystem, devices may have one or more sensors and may be enabled to communicate status, usage, and other data in real-time to be stored in the cloud, for example cloud 604. As illustrated herein, a user 606 may own the kitchen appliance 612. Another set of users 608 may be in need of said kitchen appliance. As described in the method herein, a system may identify the kitchen appliance, value it, and determine a vendor on which to sell it. In this example, since a set of users 608 interested in obtaining the kitchen appliance 612 exist within the IOT ecosystem 610, the system may determine the vendor suited for the sale is an internal, IOT service vendor. In this case, the user 606 may be notified of the internal vendor as well as the price for which the user 606 can sell the device. The user could assent to this sale, and the sale of the kitchen appliance could be offered to the users 608.

In another case, the users 608 may not be interested in obtaining the kitchen appliance 612. In this case, the system can reach outside the IOT ecosystem 610 to access a set of one or more external vendors 602, on which the kitchen appliance 612 may be posted for sale. In this way, the kitchen appliance 612 within the IOT ecosystem 610 may be made available for sale to a broader base of users, including external users 614.

Figure 7:
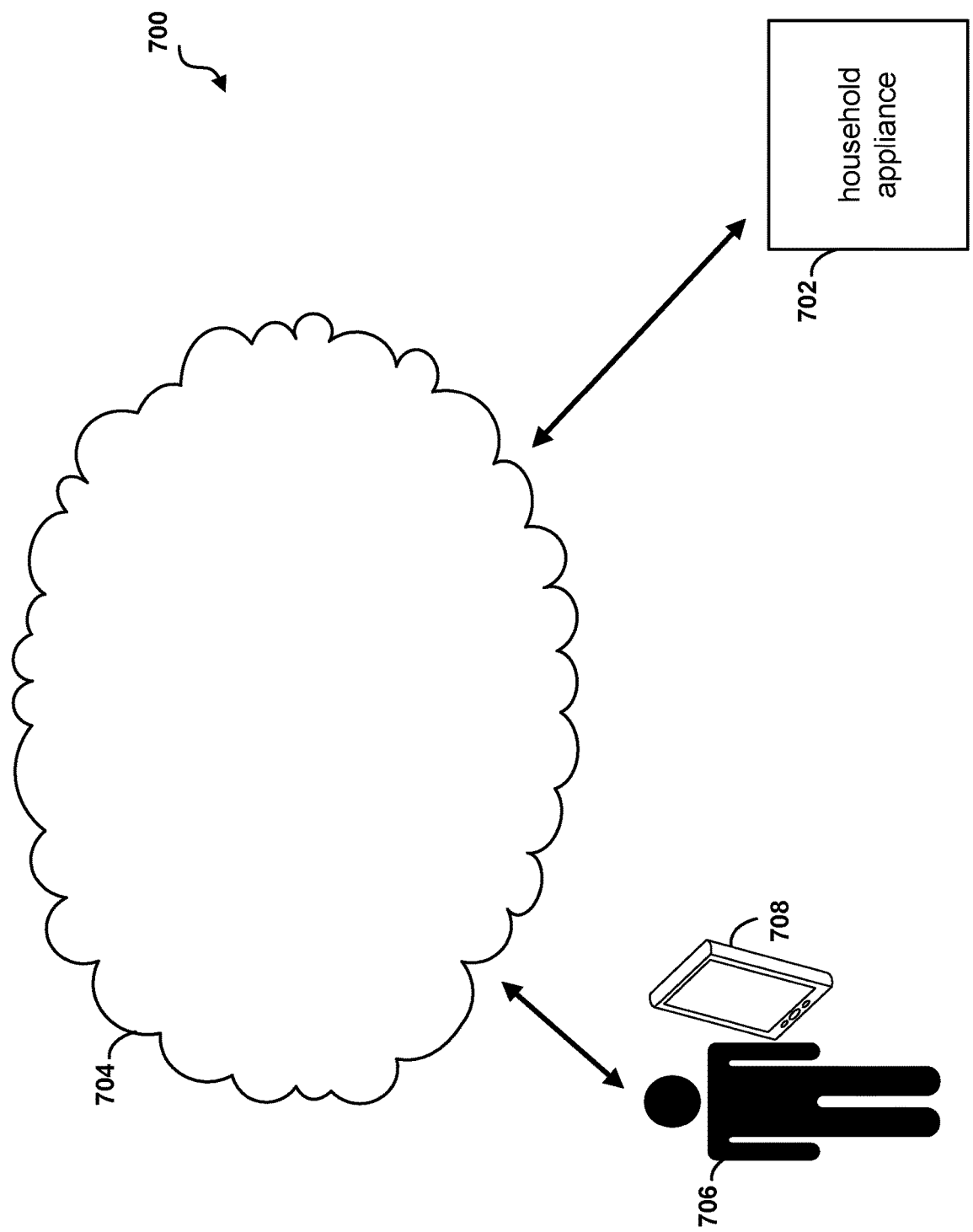
FIG. 7 depicts another use case, where a product in an internet of things environment recommends itself for replacement, according to embodiments.

FIG. 7 depicts another user case, wherein a product in an internet of things environment 700 recommends itself for replacement, according to embodiments. The product, for example, a household appliance 702 may be a sensor-enabled smart device such as one of the devices 104 in FIG. 1. Data about the household appliance 702 may be stored locally on the device, or may be stored in the cloud or, in for example, one or more databases accessible by the device over a network. Thus, relevant device data may be stored within the cloud or in a number of locations outside of the cloud, and be used by the system or the household appliance 702. In embodiments, the device may be enabled to alert a user, for example user 706, or a system (not pictured), for example recommending system 126 of FIG. 1, that the device itself is a candidate to be exchanged. In embodiments, this determination may be made using a number of factors including the age of the item, the current price of the item, price trends surrounding the item, and other data. The household appliance 702 may communicate over a network 704, for example, a cloud-based network within an IOT environment 700, to a user device 708 in order to notify the user 706 that the particular household applicant 702 is a strong candidate for sale. In this way, a user can interact directly with an IOT or sensor-enabled device such as a household appliance 702, in order to take steps to sell the household appliance 702.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
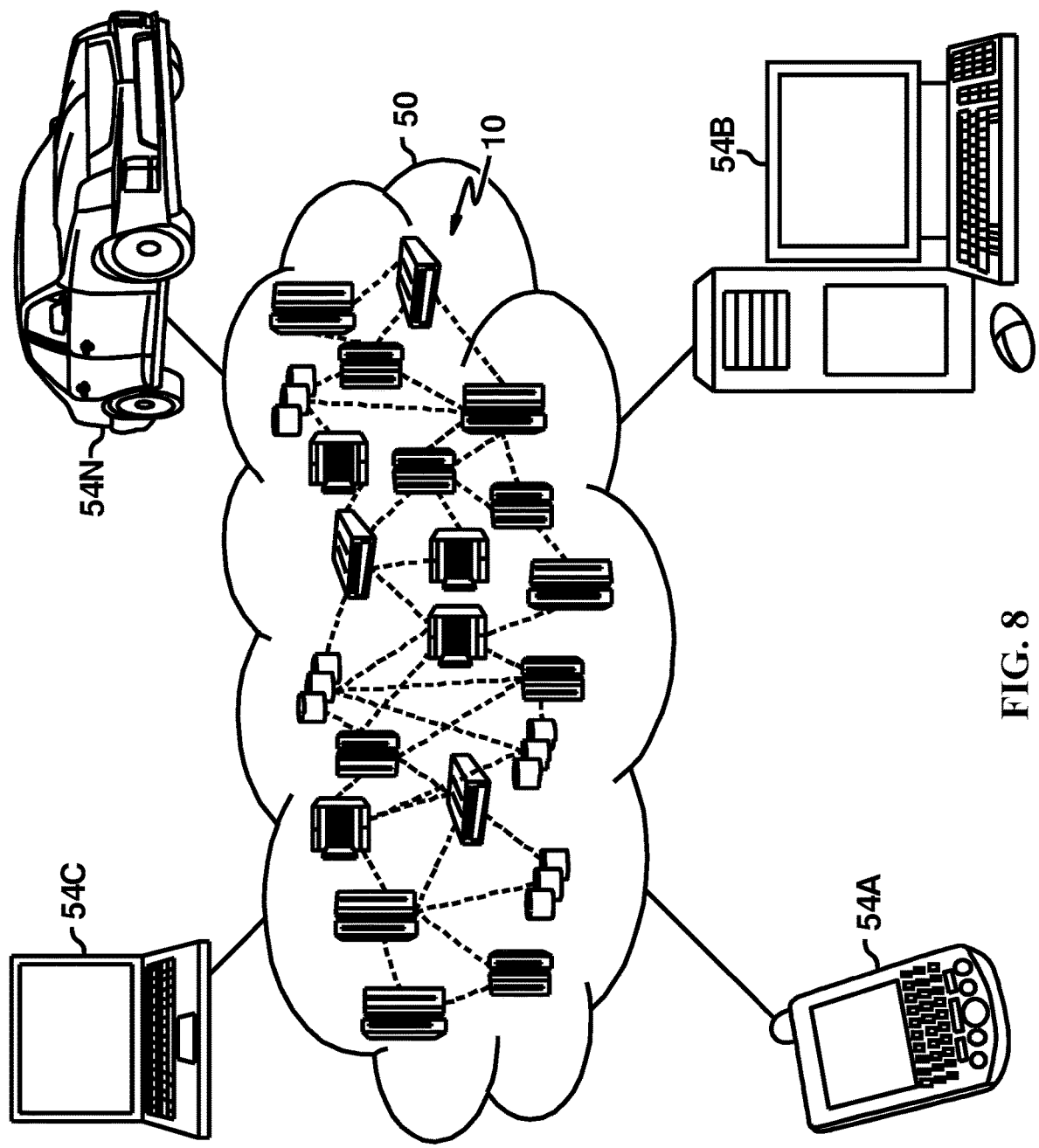
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
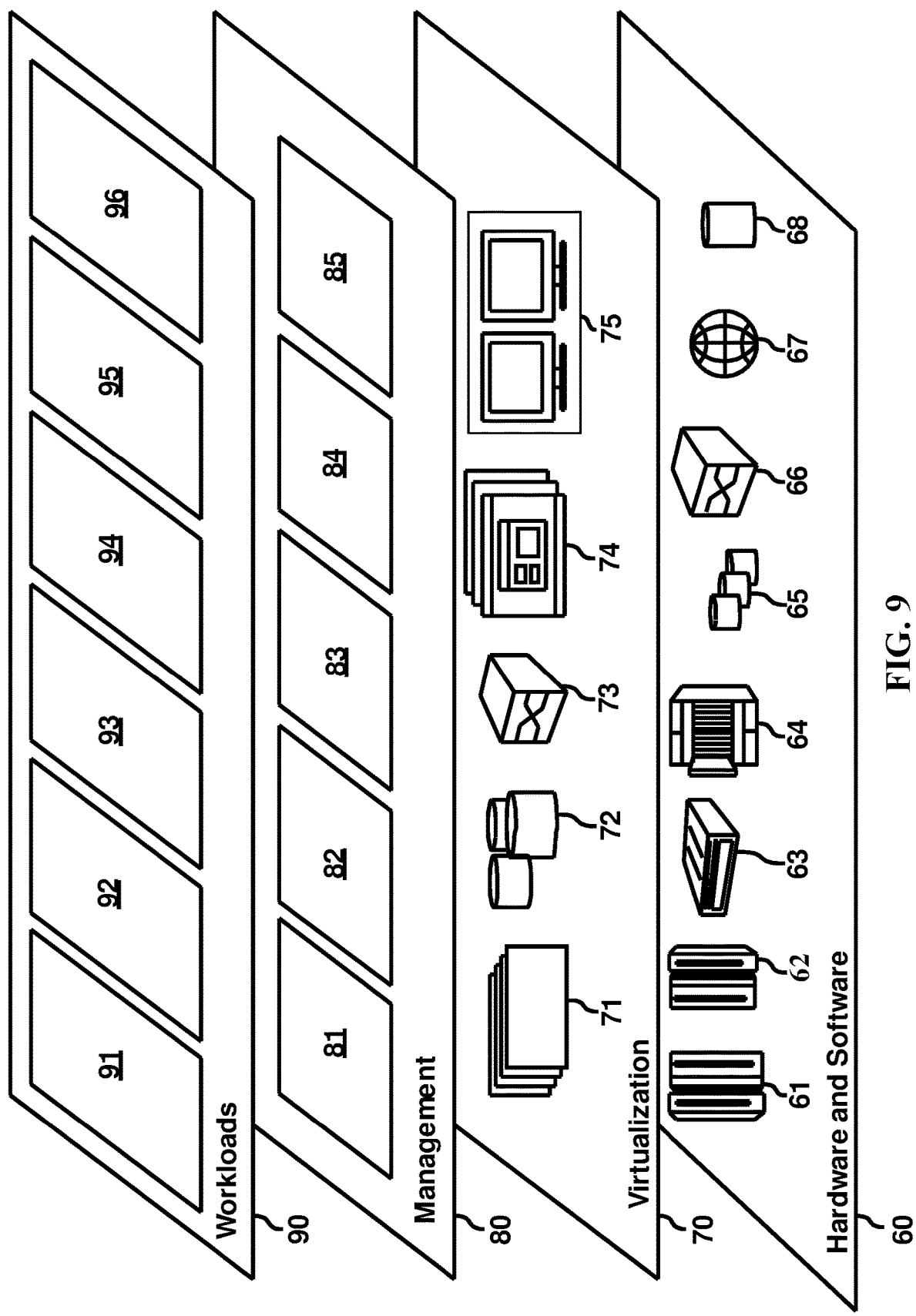
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device recommending 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    identifying a sensor-enabled smart device associated with a user, the sensor-enabled smart device having an ability to send and receive real-time data over a network, the network including an internal internet of things ecosystem and an external ecosystem existing outside the internet of things ecosystem, and the sensor-enabled smart device being identified based on a registry and a latency period between connections to the network;
    determining, by one or more user analytics operations, a set of analytic data associated with the sensor-enabled smart device and the user, the set of analytic data including first user analytic data for the user and device data for the sensor-enabled smart device, accessed from the internal internet of things ecosystem, at least a portion of the set of analytic data corresponding to the latency period between connections to the network by the sensor-enabled smart device;
    determining a set of market analytic data associated with the sensor-enabled smart device from the external ecosystem and the internal internet of things ecosystem;
    selecting a subset of analytic data from the set of analytic data and the set of market analytic data;
    generating, based on the subset of analytic data, a set of values for the sensor-enabled smart device;
    determining, based on the set of market analytic data, a set of internal vendors existing within the internal internet of things ecosystem and a set of external vendors existing within the external ecosystem, each internal vendor and each external vendor associated with a value of the set of values;
    identifying one or more interested parties existing within the internal internet of things ecosystem, the one or more interested parties identified based on second user analytic data for the one or more interested parties;
    selecting an internal vendor of the set of internal vendors through which to sell the sensor enabled smart device, the internal vendor selected based, at least in part, on the one or more interested parties identified as existing within the internal internet of things ecosystem; and
    generating a recommendation for the user, the recommendation indicating a sale of the sensor-enabled smart device, the selected internal vendor, and the one or more interested parties.

2. The method of claim 1, wherein the user analytics are performed in real-time.

3. The method of claim 1, wherein the user analytics are performed using the device data associated with the sensor-enabled smart device, the device data including frequency of device use, age of device, and novelty of the sensor-enabled smart device, and wherein the device data is collected using natural language processing.

4. The method of claim 1, wherein the user analytics are performed using user data for the user, wherein the user data includes financial status of the user, spending habits of the user, and a travel schedule for the user, and wherein the user data is collected using natural language processing.

5. The method of claim 1, wherein the market analytics comprise vendor data, wherein the vendor data includes names of internet retailers, historical selling price data, and upcoming sale data of various internet retailers.

6. The method of claim 1, wherein the market analytics comprise market data including predicted market trends in markets associated with the sensor-enabled smart device, weather patterns that may impact the sale of products within a same segment as the sensor-enabled smart device, and supply data for products similar to the sensor-enabled smart device.

7. The method of claim 1, wherein the sensor-enabled smart device is an internet-of-things device, and wherein the sensor-enabled smart device is connected to other internet of things devices over the network.

8. The method of claim 1, wherein the registry comprises a set of sensor-enabled smart devices, and wherein each device in the set of sensor-enabled smart devices are owned by a set of users.

9. The method of claim 1, further comprising:
receiving, from the user, assent to the recommending of the sale of the sensor-enabled smart device via an internal vendor of the set of internal vendors; and
posting, to the internal vendor, the sensor-enabled smart device.

10. The method of claim 1, wherein the recommending further includes a prospective price at which the sensor-enabled smart device may sell.

11. The method of claim 1, wherein the determining of the set of internal vendors is executed by the sensor-enabled smart device, and the recommending occurs over a network via a user device.

12. A computer system comprising:
at least one processor circuit configured to:
identifying a sensor-enabled smart device associated with a user, the sensor-enabled smart device having an ability to send and receive real-time data over a network, the network including an internal internet of things ecosystem and an external ecosystem existing outside the internet of things ecosystem, and the sensor-enabled smart device being identified based on a registry and a latency period between connections to the network;
determining, by one or more user analytics operations, a set of analytic data associated with the sensor-enabled smart device and the user, the set of analytic data including first user analytic data for the user and device data for the sensor-enabled smart device, accessed from the internal internet of things ecosystem, at least a portion of the set of analytic data corresponding to the latency period between connections to the network by the sensor-enabled smart device;
determine a set of market analytic data associated with the sensor-enabled smart device from the external ecosystem and the internal internet of things ecosystem;
select a subset of analytic data from the set of analytic data and the set of market analytic data;
generate, based on the subset of analytic data, a set of values for the sensor-enabled smart device;
determine, based on the set of market analytic data, a set of internal vendors existing within the internal internet of things ecosystem and a set of external vendors existing within the external ecosystem, each internal vendor and each external vendor associated with a value of the set of values;
identify one or more interested parties existing within the internal internet of things ecosystem, the one or more interested parties identified based on second user analytic data for the one or more interested parties;
select an internal vendor of the set of internal vendors through which to sell the sensor enabled smart device, the internal vendor selected based, at least in part, on the one or more interested parties identified as existing within the internal internet of things ecosystem; and
generate a recommendation for the user, the recommendation indicating a sale of the sensor-enabled smart device, the selected internal vendor, and the one or more interested parties.

13. The computer system of claim 12, wherein the user analytics are performed in real-time.

14. The computer system of claim 12, wherein the user analytics are performed using the device data, and wherein the device data is collected using natural language processing.

15. The computer system of claim 12, wherein the user analytics are performed using user data for the user, wherein the user data includes financial status of the user, spending habits of the user, and a travel schedule for the user, and wherein the user data is collected using natural language processing.

16. A computer program product for recommending a sensor-enabled device, the computer program product comprising a computer readable storage medium having program instructions embodied therewith, wherein the computer readable storage medium is not a transitory signal per se, the program instructions executable by a computer processing circuit to cause the circuit to perform a method comprising:
identifying a sensor-enabled smart device associated with a user, the sensor-enabled smart device having an ability to send and receive real-time data over a network, the network including an internal internet of things ecosystem and an external ecosystem existing outside the internet of things ecosystem, and the sensor-enabled smart device being identified based on a registry and a latency period between connections to the network;
determining, by one or more user analytics operations, a set of analytic data associated with the sensor-enabled smart device and the user, the set of analytic data including first user analytic data for the user and device data for the sensor-enabled smart device, accessed from the internal internet of things ecosystem, at least a portion of the set of analytic data corresponding to the latency period between connections to the network by the sensor-enabled smart device;
determining a set of market analytic data associated with the sensor-enabled smart device from the external ecosystem and the internal internet of things ecosystem;

selecting a subset of analytic data from the set of analytic data and the set of market analytic data;

generating, based on the subset of analytic data, a set of values for the sensor-enabled smart device;

determining, based on the set of market analytic data, a set of internal vendors existing within the internal internet of things ecosystem and a set of external vendors existing within the external ecosystem, each internal vendor and each external vendor associated with a value of the set of values;

identifying one or more interested parties existing within the internal internet of things ecosystem, the one or more interested parties identified based on second user analytic data for the one or more interested parties;

selecting an internal vendor of the set of internal vendors through which to sell the sensor enabled smart device, the internal vendor selected based, at least in part, on the one or more interested parties identified as existing within the internal internet of things ecosystem; and generating a recommendation for the user, the recommendation indicating a sale of the sensor-enabled smart device, the selected internal vendor, and the one or more interested parties.

17. The computer program product of claim 16, wherein the user analytics are performed in real-time.

18. The computer program product of claim 16, wherein the user analytics are performed using the device data associated with the sensor-enabled smart device, the device data including frequency of device use, age of device, and novelty of the sensor-enabled smart device, and wherein the device data is collected using natural language processing.

19. The computer program product of claim 16, wherein the sensor-enabled smart device is an internet-of-things device, and wherein the sensor-enabled smart device is connected to other internet of things devices over the network.

20. The computer program of claim 16, wherein the method further comprises:

receiving, from the user, assent to the recommending of the sale of the sensor-enabled smart device via an internal vendor of the set of internal vendors; and posting, to the internal vendor, the sensor-enabled smart device.

* * * * *